(12) United States Patent
De Maindreville et al.

(10) Patent No.: US 10,605,010 B2
(45) Date of Patent: Mar. 31, 2020

(54) FIXED CUTTER DRILL BIT HAVING CUTTER ORIENTING SYSTEM

(71) Applicant: VAREL EUROPE S.A.S., Pau (FR)

(72) Inventors: Bruno Cuillier De Maindreville, Pau (FR); Gilles Gallego, Ibos (FR); Anthony Salliou, Lee (FR); Yves Cazalas, Ibos (FR); Vijayavelan Vijayabalan, Cypress, TX (US)

(73) Assignee: VAREL EUROPE S.A.S., Pau (FR)

( * ) Notice: Subject to any disclaimer, the term of this patent is extended or adjusted under 35 U.S.C. 154(b) by 26 days.

(21) Appl. No.: 15/971,613

(22) Filed: May 4, 2018

(65) Prior Publication Data
US 2018/0355672 A1 Dec. 13, 2018

Related U.S. Application Data

(60) Provisional application No. 62/548,627, filed on Aug. 22, 2017, provisional application No. 62/518,850, filed on Jun. 13, 2017.

(51) Int. Cl.
| | | |
|---|---|---|
| *E21B 10/573* | (2006.01) | |
| *E21B 10/42* | (2006.01) | |
| *B23C 3/16* | (2006.01) | |
| *E21B 10/633* | (2006.01) | |
| *B23P 15/28* | (2006.01) | |
| *E21B 10/567* | (2006.01) | |
| *B23K 1/00* | (2006.01) | |

(Continued)

(52) U.S. Cl.
CPC .............. *E21B 10/573* (2013.01); *B23C 3/16* (2013.01); *B23P 15/28* (2013.01); *E21B 10/42* (2013.01); *E21B 10/5673* (2013.01); *E21B 10/633* (2013.01); *B22D 19/06* (2013.01); *B22D 23/06* (2013.01); *B23K 1/0008* (2013.01)

(58) Field of Classification Search
CPC .... E21B 2010/425; E21B 10/43; E21B 10/55; E21B 2010/561; E21B 2010/564; E21B 10/567; E21B 10/573; E21B 10/62; E21B 2010/622; E21B 2010/624; E21B 10/627; E21B 10/633
See application file for complete search history.

(56) References Cited

U.S. PATENT DOCUMENTS

| 4,570,725 A * | 2/1986 | Matthias ............... E21B 10/573 |
| | | 175/415 |
| 4,654,947 A | 4/1987 | Davis |
| 5,285,859 A | 2/1994 | Tibbits |

(Continued)

FOREIGN PATENT DOCUMENTS

WO 2018/231343 12/2018

*Primary Examiner* — Nicole Coy

(57) ABSTRACT

A bit for drilling a wellbore includes: a shank having a coupling formed at an upper end thereof; a body mounted to a lower end of the shank; and a cutting face forming a lower end of the bit. The cutting face includes: a blade protruding from the body; a cutter including: a substrate mounted in a pocket formed in the blade; and a cutting table made from a superhard material, mounted to the substrate, and having a non-planar working face with a cutting feature; and a cutter orienting system including: a keyway formed in the substrate and angularly located opposite from the cutting feature; and a key formed in or mounted to the pocket and engaged with the keyway.

14 Claims, 11 Drawing Sheets

(51) Int. Cl.
*B22D 23/06* (2006.01)
*B22D 19/06* (2006.01)

(56) References Cited

U.S. PATENT DOCUMENTS

| | | |
|---|---|---|
| 7,070,011 B2 | 7/2006 | Sherwood, Jr. |
| 7,726,420 B2 * | 6/2010 | Shen .................. E21B 10/5735 175/430 |
| 8,011,456 B2 | 9/2011 | Sherwood, Jr. |
| 8,132,633 B2 | 3/2012 | Cuillier De Maindreville |
| 9,481,033 B2 | 11/2016 | Heuser |
| 2017/0058615 A1 | 3/2017 | Liang |

* cited by examiner

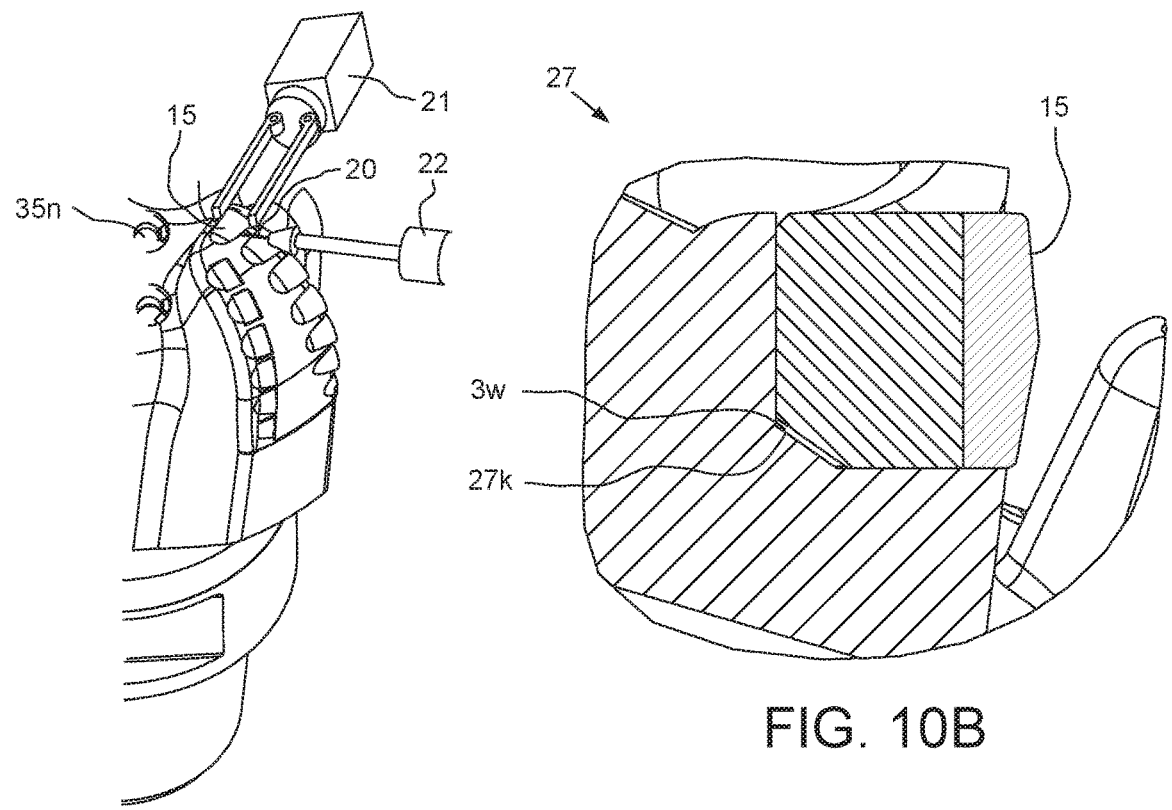
FIG. 10A
FIG. 10B
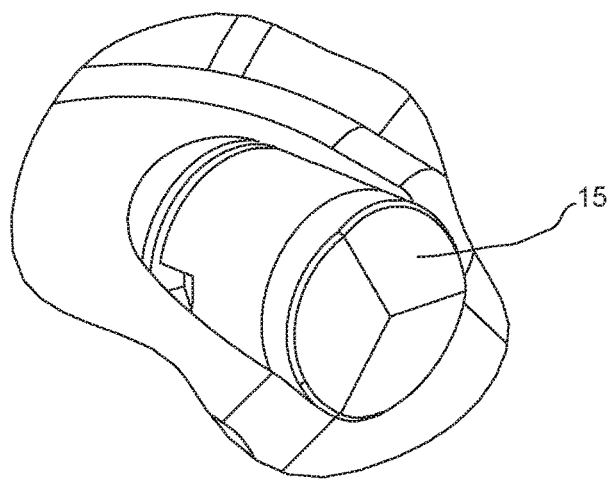
FIG. 10C

FIXED CUTTER DRILL BIT HAVING CUTTER ORIENTING SYSTEM

BACKGROUND OF THE DISCLOSURE

Field of the Disclosure

The present disclosure generally relates to a fixed cutter drill bit having a cutter orienting system.

Description of the Related Art

U.S. Pat. No. 4,654,947 discloses a method and apparatus by which the cutting face of a drill bit is renewed. The drill bit has a cutting face including a plurality of radially spaced apart stud assemblies, each received within a socket. A polycrystalline diamond disc forms one end of the stud assembly. The socket is in the form of a counterbore extending angularly into the bit body so that when a marginal end of the stud assembly is forced into a socket, a portion of the face of the diamond disc extends below the bottom of the bit body for engagement with the bottom of a borehole. A passageway communicates with the rear of the counterbore and extends back to a surface of the bit. Fluid pressure is effected within the passageway, thereby developing sufficient pressure differential across the stud assembly to cause the stud assembly to move respective to the socket. This action forces a marginal end of the stud assembly to move sufficiently respective to the socket so that the free marginal end of the stud assembly can be grasped by a tool and manipulated in a manner to bring an unused cutting edge of the diamond disc into operative cutting relationship respective to the bottom of the bit. The reoriented stud assembly is forced back onto seated relationship respective to the socket. The stud assembly includes a circumferentially extending seal means which cooperates with the socket interior with a piston-like action.

U.S. Pat. No. 5,285,859 discloses a drill bit cutter structure and means of mounting said cutter structure relative to a drill bit for drilling earth formations in which the cutter structure provides diverse rotational orientation of the cutting element about at least one axis relative to the drill bit. The cutter structure generally includes a bearing surface associated with the drill bit, a supporting member articulable with the bearing surface to provide diverse orientation thereof, and a cutting element secured to said supporting member.

U.S. Pat. No. 7,070,011 discloses a steel body rotary drag bit for drilling a subterranean formation including a plurality of support elements affixed to the bit body, each forming at least a portion of a cutting element pocket. Each of a plurality of cutting elements has a substantially cylindrical body and is at least partially disposed within a cutter pocket. At least a portion of the substantially cylindrical body of each cutting element is directly secured to at least a portion of a substantially arcuate surface of the bit body. At least a portion of a substantially planar surface of each cutting element matingly engages at least a portion of a substantially planar surface of a support element.

U.S. Pat. No. 8,011,456 discloses a cutting element for use with a drill bit including a substrate having a longitudinal axis, a lateral surface substantially symmetric about the longitudinal axis and one or more key elements coupled to the lateral surface. The lateral surface lies between an insertion end and a cutting end of the substrate. The one or more key elements are substantially axially aligned with the longitudinal axis and configured to selectively rotationally locate the substrate in a pocket. A drill bit configured for retaining a cutting element having one or more key elements is also disclosed.

U.S. Pat. No. 8,132,633 discloses a self positioning cutter element and cutter pocket for use in a downhole tool having one or more cutting elements. The self positioning cutter element includes a substrate and a wear resistant layer coupled to the substrate. The cutter element includes a cutting surface, a coupling surface, and a longitudinal side surface forming the circumferential perimeter of the cutter element and extending from the cutting surface to the coupling surface. The cutter element has one or more indexes formed on at least a portion of the coupling surface. In some embodiments, the index also is formed on at least a portion of the longitudinal side surface. Hence, the coupling surface is not substantially planar. Additionally, at least a portion of the longitudinal side surface does not form a substantially uniform perimeter. The cutter pocket also is indexed to correspond and couple with the indexing of the cutter element.

U.S. Pat. No. 9,481,033 discloses an earth-boring tool including a body having at least one blade, and at least one cutting element recess may be formed in a surface of the at least one blade. At least one cutting element may be affixed within the at least one cutting element recess. The at least one cutting element may comprise a substantially cylindrical lateral side surface configured to allow the at least one cutting element to rotate about a longitudinal axis within the at least one cutting element recess when the at least one cutting element is partially inserted into the at least one cutting element recess. The at least one cutting element includes a back face comprising alignment features configured to abut complementary alignment features disposed on a back surface of the at least one cutting element recess.

US 2017/0058615 discloses a convex ridge type non-planar cutting tooth and a diamond drill bit, the convex ridge type non-planar cutting tooth including a cylindrical body, the surface of the end portion of the cylindrical body is provided with a main cutting convex ridge and two non-cutting convex ridges, the inner end of the main cutting convex ridge and the inner ends of the two non-cutting convex ridges converge at the surface of the end portion of the cylindrical body, the outer end of the main cutting convex ridge and the outer ends of the two non-cutting convex ridges extend to the outer edge of the surface of the end portion of the cylindrical body, the surfaces of the end portion of the cylindrical body on both sides of the main cutting convex ridge are cutting bevels. The convex ridge type non-planar cutting tooth and the diamond drill bit have great ability of impact resistance and balling resistance. According to the features of drilled formation, convex ridge type non-planar cutting teeth are arranged on the drill bit with different mode, which can improve the mechanical speed and footage of the drill bit.

SUMMARY OF THE DISCLOSURE

The present disclosure generally relates to a fixed cutter drill bit having a cutter orienting system. In one embodiment, a bit for drilling a wellbore includes: a shank having a coupling formed at an upper end thereof; a body mounted to a lower end of the shank; and a cutting face forming a lower end of the bit. The cutting face includes: a blade protruding from the body; a cutter including: a substrate mounted in a pocket formed in the blade; and a cutting table made from a superhard material, mounted to the substrate, and having a non-planar working face with a cutting feature;

and a cutter orienting system including: a keyway formed in the substrate and angularly located opposite from the cutting feature; and a key formed in or mounted to the pocket and engaged with the keyway.

In another embodiment, a bit for drilling a wellbore includes: a shank having a coupling formed at an upper end thereof; a body mounted to a lower end of the shank; and a cutting face forming a lower end of the bit. The cutting face includes a blade protruding from the body; a cutter including: a substrate mounted in a pocket formed in the blade by brazing material; and a cutting table made from a superhard material and mounted to the substrate; and a cutter orienting system including: a keyway formed in an edge of the substrate; and a key formed in or mounted to the pocket at an edge of the pocket and engaged with the keyway.

In another embodiment, a method of manufacturing a drill bit includes: machining a body and cutting face from alloy stock, the cutting face having a blade protruding from the body; forming a pocket in the blade; forming a socket in the pocket; mounting a pin in the socket; and brazing a cutter into the pocket while engaging a keyway of the cutter with the pin, thereby orienting the cutter.

In another embodiment, a method of manufacturing a drill bit includes: forming a mold having an inner surface formed into a negative shape of facial features of the drill bit, the mold having a cutter displacement pocket with a keyway formed therein; mounting a cutter displacement into the cutter displacement pocket while engaging a key formed on the cutter displacement with the keyway, thereby orienting a key-former of the cutter displacement; assembling the mold as part of a casting assembly; loading powder into the mold, the powder comprising at least one of: ceramic powder and cermet powder; placing a binder alloy into the casting assembly over the mold; inserting the casting assembly, powder, and binder alloy into a furnace; operating the furnace to melt the binder alloy, thereby infiltrating the powder with the binder alloy and forming a body and a blade protruding from the body and having a cutter pocket formed by the cutter displacement; and brazing a cutter into the pocket while engaging a keyway of the cutter with a key formed by the key-former, thereby orienting the cutter.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 10A-10C illustrate brazing of the shaped cutter into the pocket and engagement of a key of the second COS with one of the keyways.

DETAILED DESCRIPTION

Figure 1A:
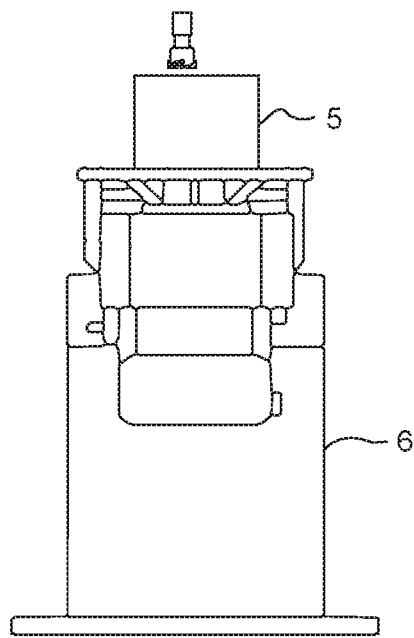
FIGS. 1A-1D illustrate manufacture of an alloy body of a fixed cutter drill bit having a cutter orienting system (COS), according to one embodiment of the present disclosure.
Figure 1C:
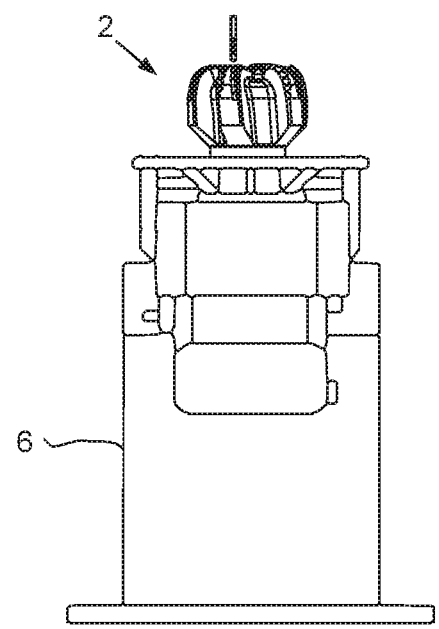

FIGS. 1A-1D illustrate manufacture of an alloy body 2 of a fixed cutter drill bit 1 (FIG. 5) having a cutter orienting system (COS) 3, according to one embodiment of the present disclosure. FIGS. 2A and 2B illustrate a typical leading cutter pocket 4 of the drill bit 1. Referring specifically to FIG. 1A, a piece of round stock 5 may be received from a metalworking plant. The round stock 5 may be made from an alloy, such as steel. The round stock 5 may be mounted in a computer numerical control (CNC) machine tool 6.

Figure 1B:
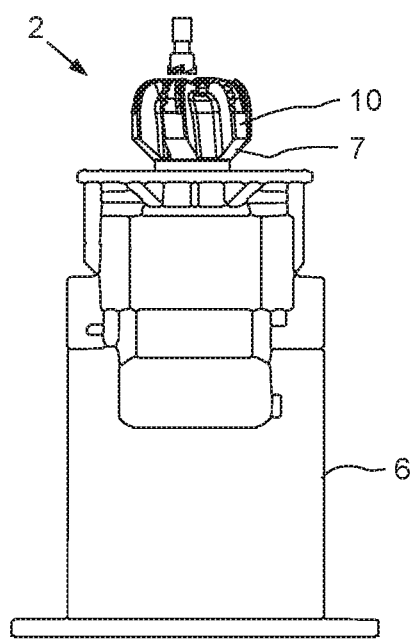
Figure 2A:
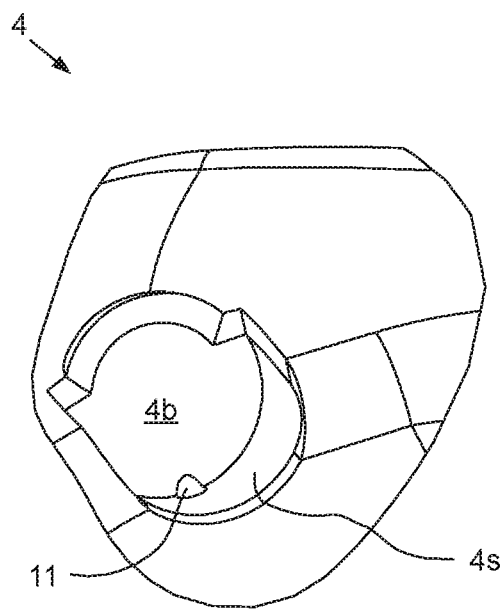
FIGS. 2A and 2B illustrate a typical leading cutter pocket of the drill bit.
Figure 2B:
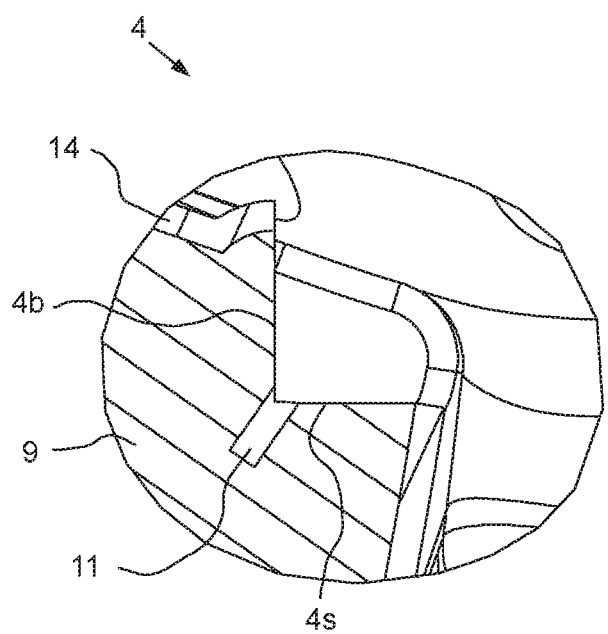

Referring specifically to FIG. 1B, the round stock 5 may be turned in the tool 6 to form a lap coupling adjacent to a mounting end thereof. The round stock 5 may be further turned in the tool 6 to form a bore (not shown) therein extending from the mounting end and a plenum (not shown) therein extending from the bore. The round stock 5 may be further turned in the tool 6 to form a taper 7 in an outer surface thereof adjacent to the lap coupling. The round stock 2 may be further turned in the tool 6 to form an inner cone 8c (numbered in FIG. 5) in a cutting face thereof, an outer shoulder 8s in the cutting face, and an intermediate nose 8n between the cone and the shoulder. The cutting face may be located at an end of the round stock 5 opposite to the mounting end. The round stock with the turned features will now be referred to as a blank.

Figure 4A:
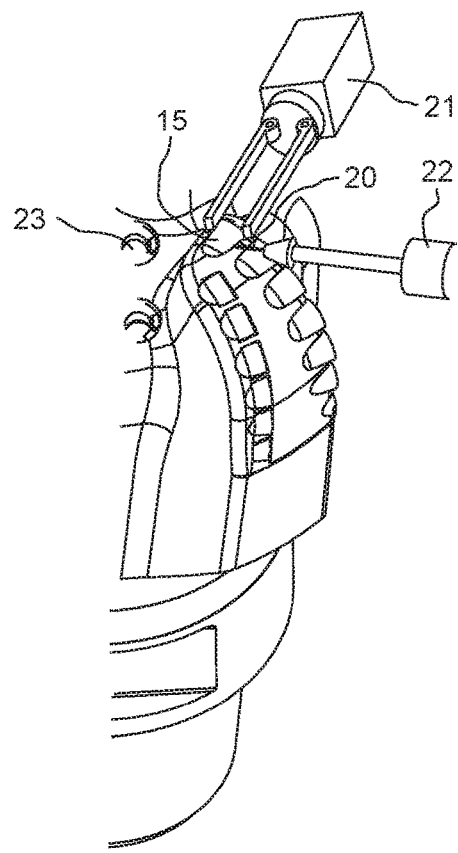
FIGS. 4A-4D illustrate brazing of the shaped cutter into the pocket and engagement of the key with one of the keyways.
Figure 4B:
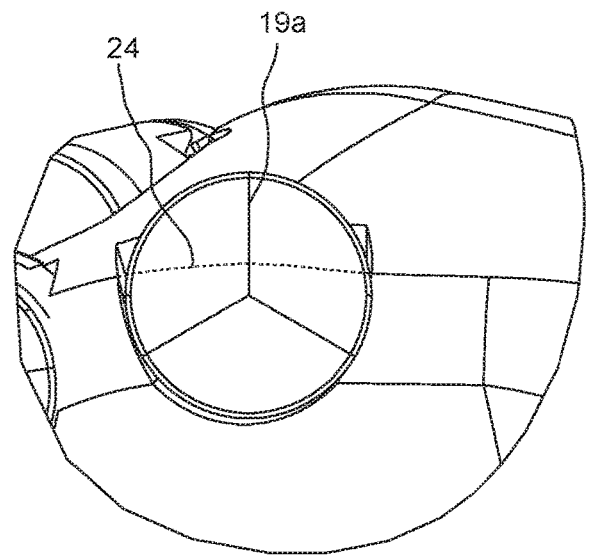
Figure 4C:
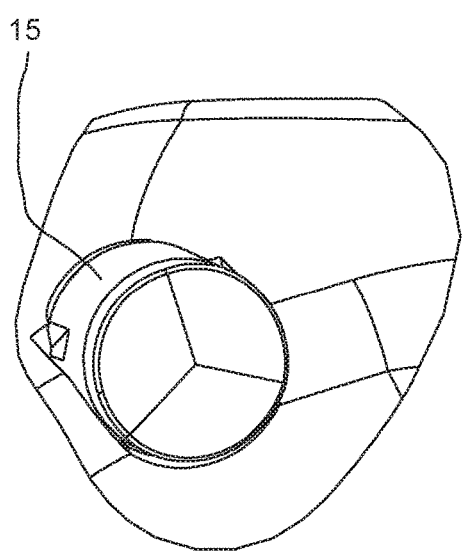
Figure 4D:
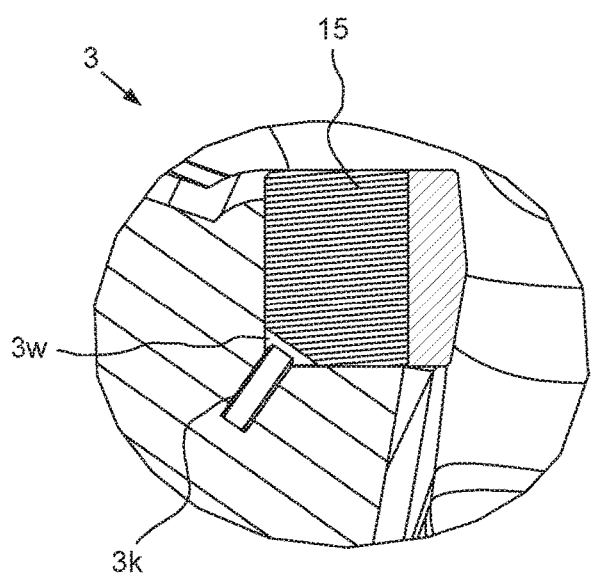

The tool 6 may then be operated to mill fluid courses in the cutting face of the blank, thereby forming a plurality of blades 9 between adjacent fluid courses. The tool 6 may be further operated to drill a plurality of ports 23 (FIG. 4A) into the blank. The ports 23 may extend from the fluid courses and to the plenum of the blank. The tool 6 may also be operated to mill junk slots in an outer surface of the blank, thereby forming a plurality of gage pads 10 between adjacent junk slots. Each gage pad 10 may extend from a respective blade 9 to a respective taper 7 and each junk slot may extent from a respective fluid course to the lap coupling. The gage pads 10 may extend along the body 2 generally longitudinally with a slight helical curvature. The gage pads 10 and junk slots may form a gage section and may define an outer portion of the drill bit 1.

The blades 9 may include one or more primary blades 9p (numbered in FIG. 5) and one or more secondary blades 9s. The blades 9 may be spaced around the cutting face and may protrude from a bottom and side of the body 2. The primary blades 9p may each extend from a center of the cutting face to the shoulder 8s. The primary blades 9p may extend generally radially along the cone 8c and nose 8n with a slight spiral curvature and generally longitudinally along the shoulder 8 with a slight helical curvature. One or more of the ports 23 may be disposed adjacent to the center of the cutting face. The secondary blades 9s may each extend from a location on the cutting face adjacent to a respective inner port to the shoulder 8s. The secondary blades 9s may extend generally radially along the nose 8n with a slight spiral curvature and generally longitudinally along the shoulder 8s with a slight helical curvature. Since the blades 9 are formed integrally with the body 2, the blades are also made from the same material as the body.

Referring specifically to FIGS. 2A and 2B, the CNC machine tool 6 may be further operated to mill a row of leading cutter pockets 4 along a leading edge of each blade 9. For the primary blades 9p, each row of leading cutter pockets 4 may extend from the center of the cutting face to a shoulder end of the respective blade. For the secondary blades 9s, each row of leading cutter pockets 4 may extend from the location adjacent to the respective inner port to a shoulder end of the respective blade. Each leading cutter pocket 4 may be shaped to receive a substrate 17 (FIG. 3A) of a respective shaped cutter 15. Each leading cutter pocket 4 may be defined by a curved sidewall 4s and a flat back wall 4b.

The CNC machine tool 6 may be further operated to mill a row of backup pockets along portions of the blades 9 in the shoulder section. Each row of backup pockets may extend into portions of the blades 9 in the nose section. Each backup pocket may be aligned with or slightly offset from a respective leading cutter 15. The CNC machine tool 6 may be further operated to mill one or more stud pockets in each primary blade 9p at a bottom of a portion thereof in the cone section 8c. The stud pockets may each be in a backup position relative to a respective leading cutter pocket 4 and may be aligned with or slightly offset from the respective leading cutter 15.

Referring specifically to FIGS. 1C, 2A, and 2B, the CNC machine tool 6 may be further operated to drill a socket 11 extending from each leading cutter pocket 4 into the respective blade 9. Each socket 11 may be located at an edge of the respective leading cutter pocket 4 formed between the sidewall 4s and back wall 4b thereof. Each socket 11 may be located at a center of the respective edge.

Figure 2C:
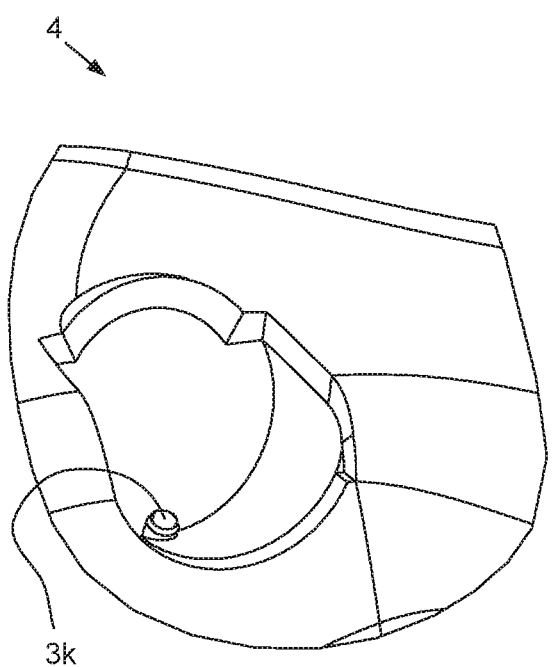
FIGS. 2C and 2D illustrate installation of a key of the COS into the cutter pocket.
Figure 2D:
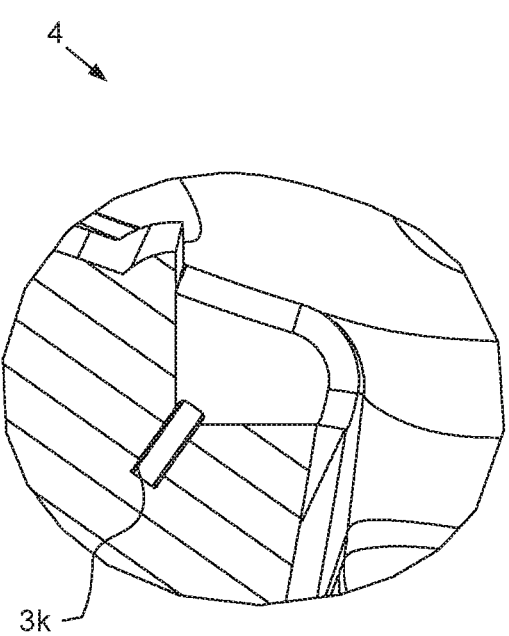

FIGS. 2C and 2D illustrate installation of a key 3k of the COS 3 into the leading cutter pocket 4. The body 2 may be removed from the tool 6 and delivered to a work station (not shown). At the work station, a technician (not shown) may mount each key 3k into the respective socket 11. Each key 3k may be a pin, such as a spring pin, and each spring pin may have chamfered ends and an expanded diameter greater than a diameter of the respective socket 11. Engagement of one of the chamfered ends with the socket may compress the spring pin during insertion by the technician. The bias of each spring pin toward the expanded diameter may firmly engage the spring pin into engagement with the respective socket 11, thereby self-mounting into the respective pocket 4. Each spring pin may be the split-type (shown) or the coiled type (not shown).

Alternatively, each key 3k may be a solid pin interference fit into the respective socket or mounted therein using an adhesive.

Figure 1D:
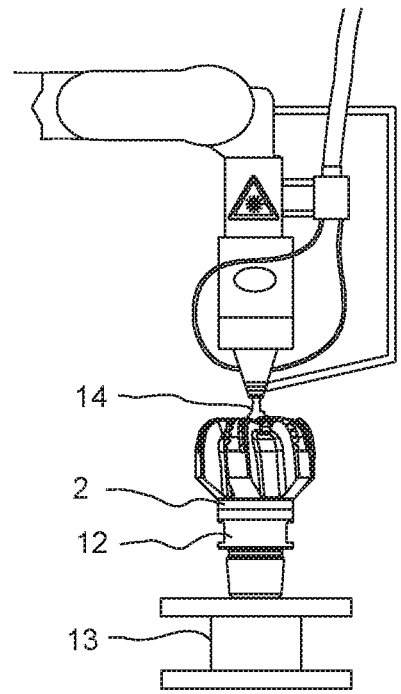

Referring specifically to FIG. 1D, the body 2 may be moved from the work station to a welding station (not shown). A shank 12 having a lap coupling may be assembled with the lap coupling of the body 2 and the connection therebetween secured by a weld. The shank 12 may have a threaded coupling, such as a pin, formed at an end opposite to the lap coupling for assembly as part of a drill string (not shown).

Alternatively, threaded couplings may be used to connect the body 2 and the shank 12. Alternatively, the shank may also be formed from the round stock 5 using the tool 6, thereby resulting in monoblock body 2 and shank 12.

The body 2 and shank 12 may be moved from the work station and mounted in a laser cladding machine 13. The laser cladding machine 13 may be operated to deposit hardfacing 14 onto the blades 9 and gage pads 10 to increase resistance thereof to abrasion and/or erosion. The hardfacing 14 may be ceramic or cermet, such as a carbide or carbide cemented by metal or alloy. The hardfacing 14 may be deposited on a portion of a leading face, a portion of a trailing face, and a bottom/outer surface of each blade 9. The hardfaced portions of the leading and trailing faces may extend from the leading and trailing edges of each blade 9 to or past mid-portions thereof. The pockets 4 may be masked from the hardfacing 14. The hardfacing 14 may be deposited on a portion of a leading face, a portion of a trailing face, and an outer surface of each gage pad 10.

Figure 3A:
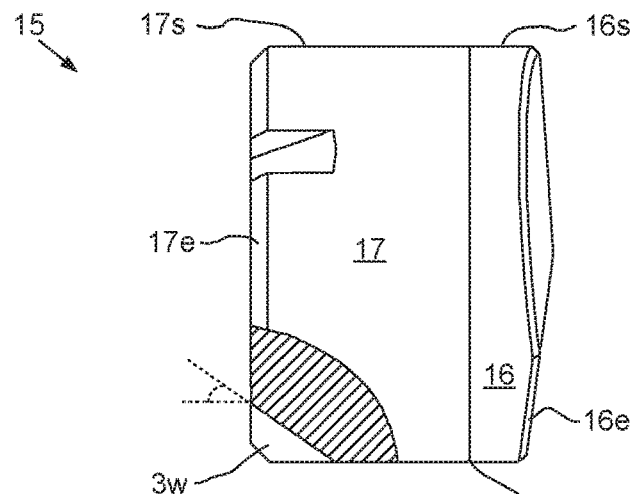
FIGS. 3A-3C illustrate a shaped cutter having keyways of the COS.
Figure 3B:
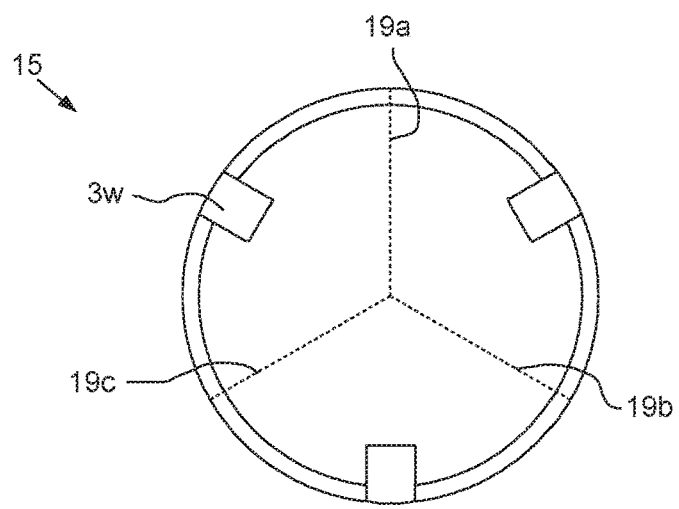
Figure 3C:
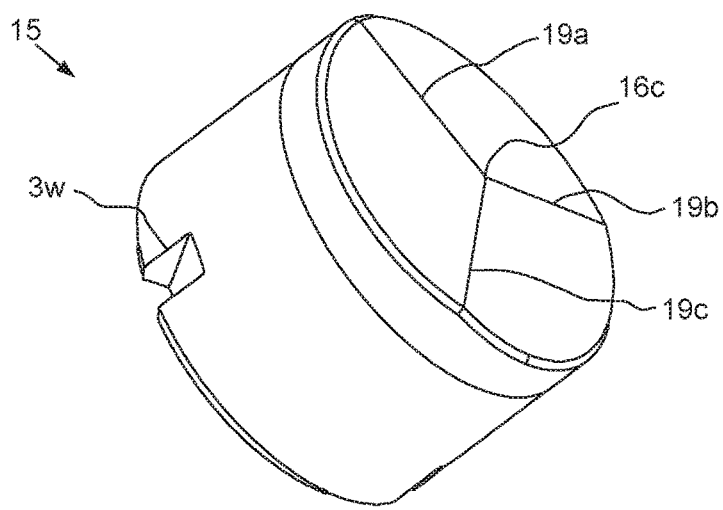

FIGS. 3A-3C illustrate a shaped cutter 15 having keyways 3w of the COS 3. The shaped cutter 15 may include a non-planar cutting table 16 mounted to a cylindrical substrate 17. The cutting table 16 may be made from a superhard material, such as polycrystalline diamond, and the substrate 17 may be made from a hard material, such as a cermet, thereby forming a compact, such as a polycrystalline diamond compact. The cermet may be a cemented carbide, such as a group VIIIB metal-tungsten carbide. The group VIIIB metal may be cobalt.

The cutting table 16 may have an interface 18 with the substrate 17 at a lower end thereof and a non-planar working face at an upper end thereof. The substrate 17 may have the interface 18 at an upper end thereof and a lower end for being received in the leading cutter pocket 4. The pocket end of the substrate 17 may have an outer chamfered edge 17e formed in a periphery thereof.

The working face may have a plurality of recessed bases, a plurality of protruding ribs, and an outer chamfered edge 16e. The bases may be located between adjacent ribs and may each extend inward from a side 16s of the cutting table 16. Each rib may extend radially outward from a center 16c of the cutting table 16 to the side 16s. Each rib may be spaced circumferentially around the working face at regular intervals, such as at one-hundred twenty degree intervals. Each rib may have a ridge 19a-c and a pair of bevels each extending from the ridge to an adjacent base.

The substrate 17 may have a keyway 3w formed therein for each ridge 19a-c. Each keyway 3w may be located at the edge 17e of the substrate 17 and may extend from the pocket end thereof along a portion of a side 17s thereof. The portion of the side 17s that each keyway 3w extends may range between fifteen and seventy percent of a length of the substrate 17. Each keyway 3w may be a slot inclined relative to a longitudinal axis of the cutter by an angle ranging between ten and seventy degrees. Each slot may have a width corresponding to a diameter of the key 3k, such as equal to or slightly greater than. Each keyway 3w may be angularly offset from the associated ridge 19a-c, such as being located opposite therefrom.

FIGS. 4A-4D illustrate brazing of the shaped cutter 15 into the leading pocket 4 and engagement of the key 3k with one of the keyways 3w. The body 2 and shank 12 may be moved from the laser cladding machine 13 to a cutter station. The cutter station may be manual or automated. The shaped cutters 15 may be mounted in the leading cutter pockets 4 of the blades 9. Each cutter 15 may be delivered to the respective pocket 4 by an articulator 21. The articulator 21 may retain the shaped cutter 15 only partially in the pocket 4 such that the keyways 3w and key 3k do not engage.

Once delivered, a brazing material 20 may be applied to an interface formed between the respective pocket 4 and the cutter 15 using an applicator 22. As the brazing material 20 is being applied to the interface, the articulator 21 may rotate the shaped cutter 15 relative to the pocket 4 to distribute the brazing material 20 throughout the interface. The articulator 21 may then be operated to align one of the keyways 3w with the key 3k and engage the aligned members, thereby ensuring that the shaped cutter 15 is properly oriented within the respective pocket 4. Proper orientation may be that the operative ridge 19a is perpendicular to a projection 24 of the leading edge of the respective blade 9 through the leading cutter pocket 4.

A heater (not shown) may then be operated to melt the brazing material 20. Cooling and solidification of the brazing material 20 may mount the cutter 15 to the respective blade 9. The brazing operation may then be repeated until all of the shaped cutters 15 have been mounted to the respective blades 9. The brazing operation may also be repeated for mounting the backup cutters and studs into the backup pockets and stud pockets. Once the cutters 15 have been mounted to the respective blades 9, a nozzle (not shown) may be inserted into the each port 23 and mounted to the body 2, such as by screwing the nozzle therein.

Each backup cutter may include a cutting table mounted to a cylindrical substrate. The cutting table may be made from a superhard material, such as polycrystalline diamond, and the substrate may be made from a hard material, such as a cermet, thereby forming a compact, such as a polycrystalline diamond compact. The cermet may be a cemented carbide, such as a group VIIIB metal-tungsten carbide. The group VIIIB metal may be cobalt. Each stud may be made from a cermet.

Figure 5:
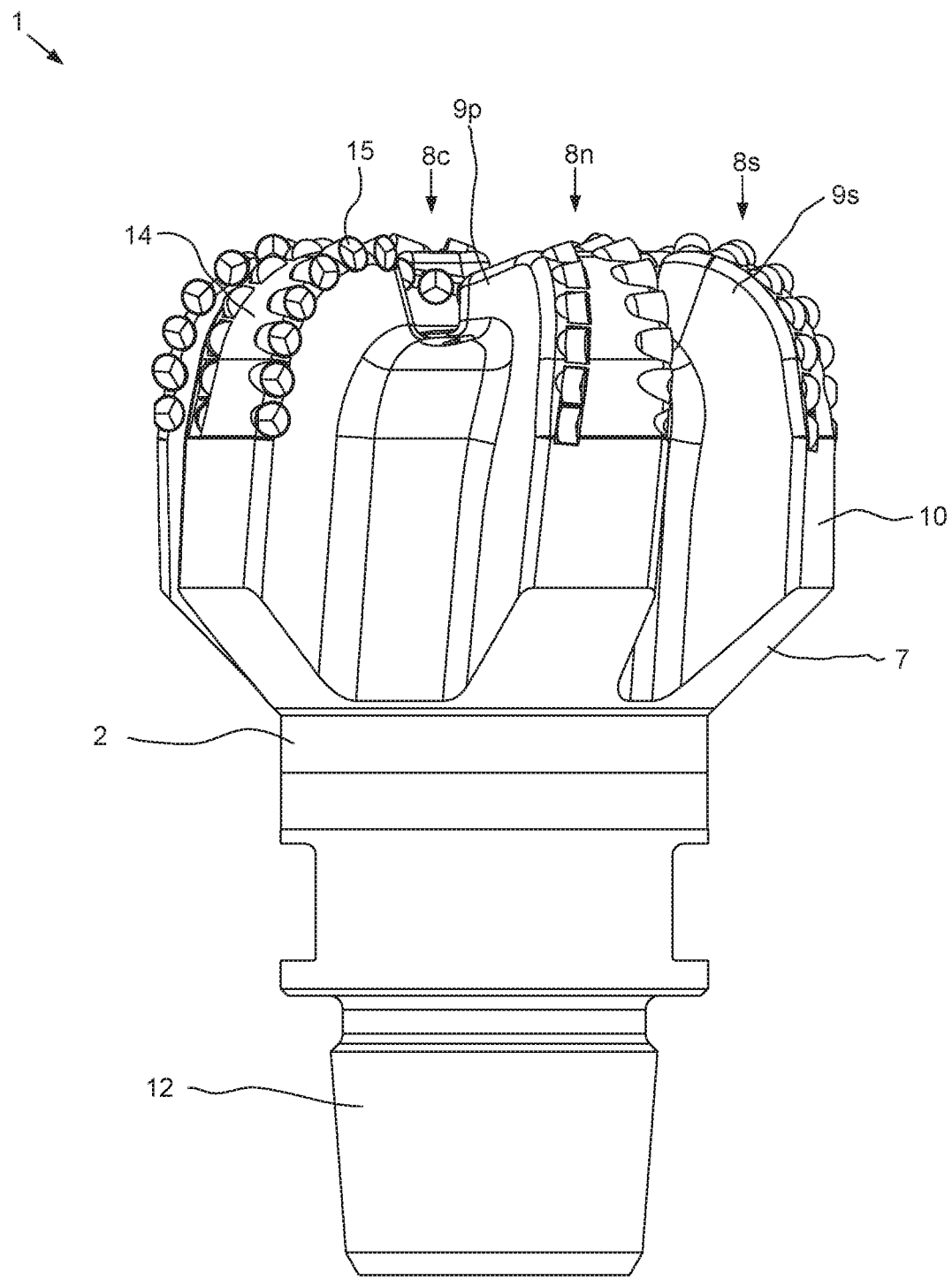
FIG. 5 illustrates the completed drill bit.

FIG. 5 illustrates the completed drill bit 1. In use (not shown), the drill bit 1 may be assembled with one or more drill collars, such as by threaded couplings, thereby forming a bottomhole assembly (BHA). The BHA may be connected to a bottom of a pipe string, such as drill pipe or coiled tubing, thereby forming a drill string. The BHA may further include a steering tool, such as a bent sub or rotary steering tool, for drilling a deviated portion of the wellbore. The pipe string may be used to deploy the BHA into the wellbore. The drill bit 1 may be rotated, such as by rotation of the drill string from a rig (not shown) and/or by a drilling motor (not shown) of the BHA, while drilling fluid, such as mud, may be pumped down the drill string. A portion of the weight of the drill string may be set on the drill bit 1. The drilling fluid may be discharged by the nozzles and carry cuttings up an annulus formed between the drill string and the wellbore and/or between the drill string and a casing string and/or liner string.

Upon retrieval of the drill bit 1 from the wellbore, the drill bit may be inspected for wear. Should a wear flat be observed on any of the leading cutters 15, the worn cutter may be de-brazed from the respective leading cutter pocket 4 and one of the keyways 3w of the unused ridges 19b,c may be engaged with the key 3k during re-brazing thereof, thereby extending the service life of the cutters 15.

Figure 6A:
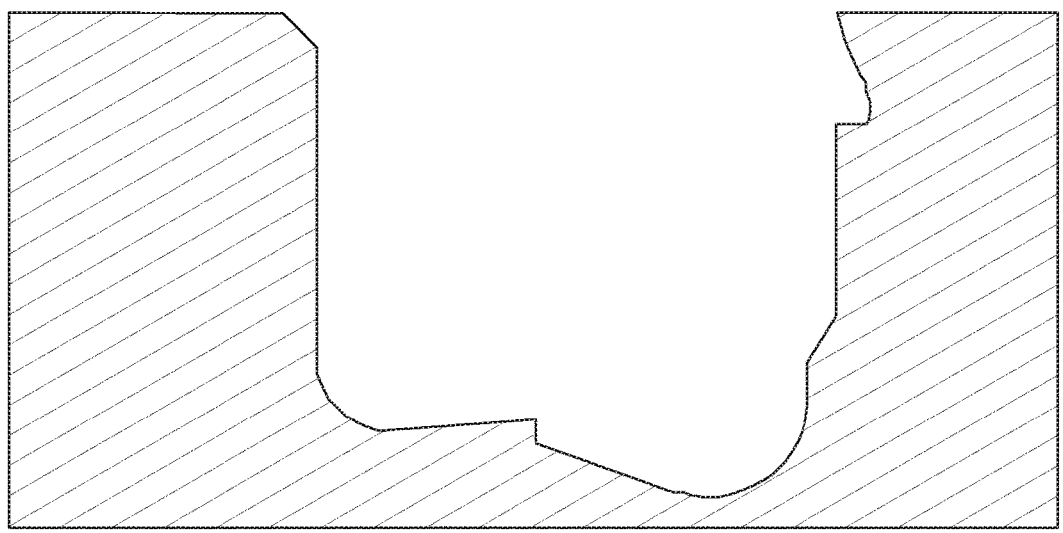
FIGS. 6A-6C illustrate a mold of a casting assembly for manufacture of a matrix body fixed cutter drill bit having a second COS, according to another embodiment of the present disclosure.
Figure 6B:
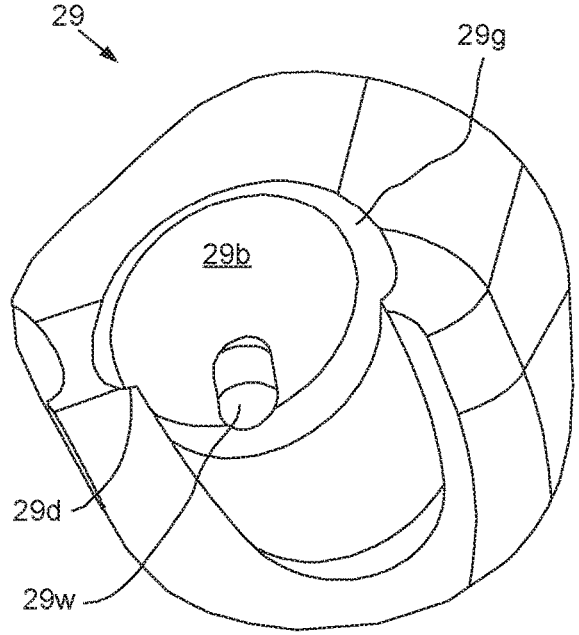
Figure 6C:
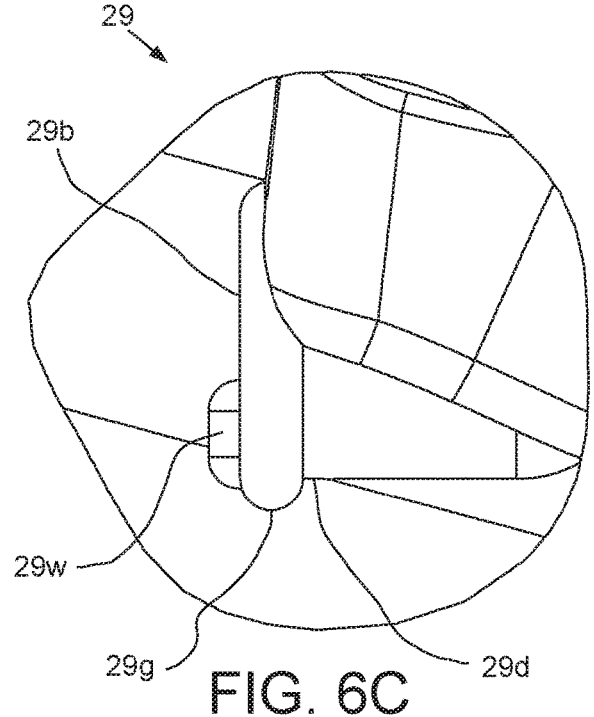
Figure 7A:
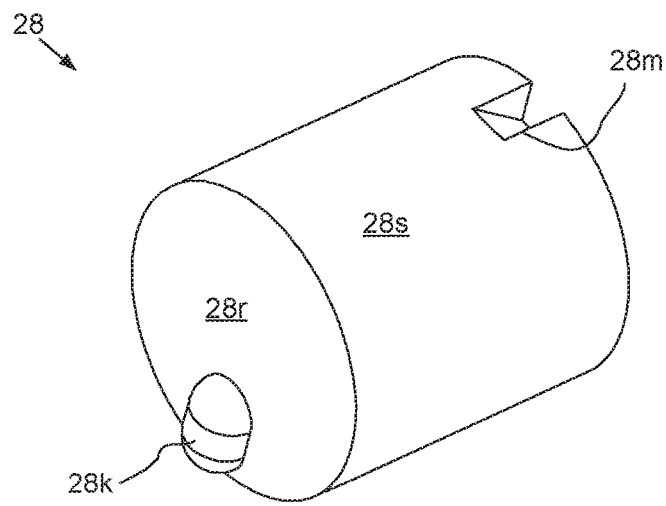
FIG. 7A illustrates a typical leading cutter displacement of the casing assembly.
Figures 7B, 7C:
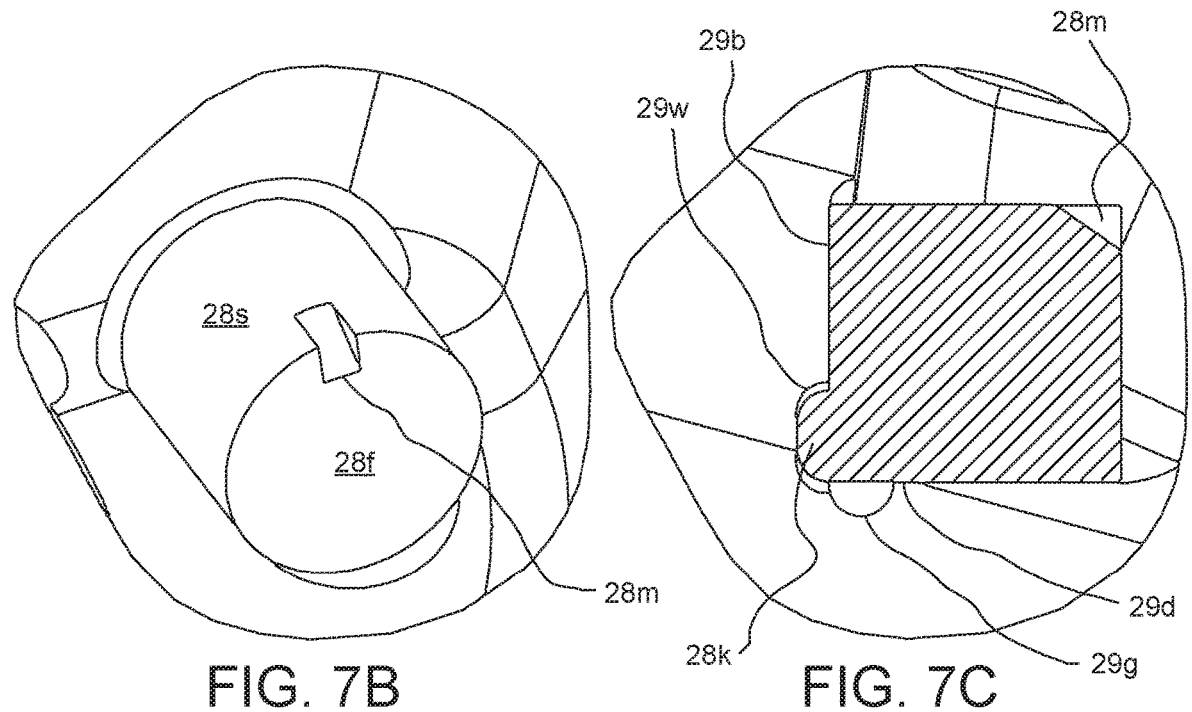
FIGS. 7B and 7C illustrate installation of the cutter displacement into a displacement pocket of the mold.
Figure 8A:
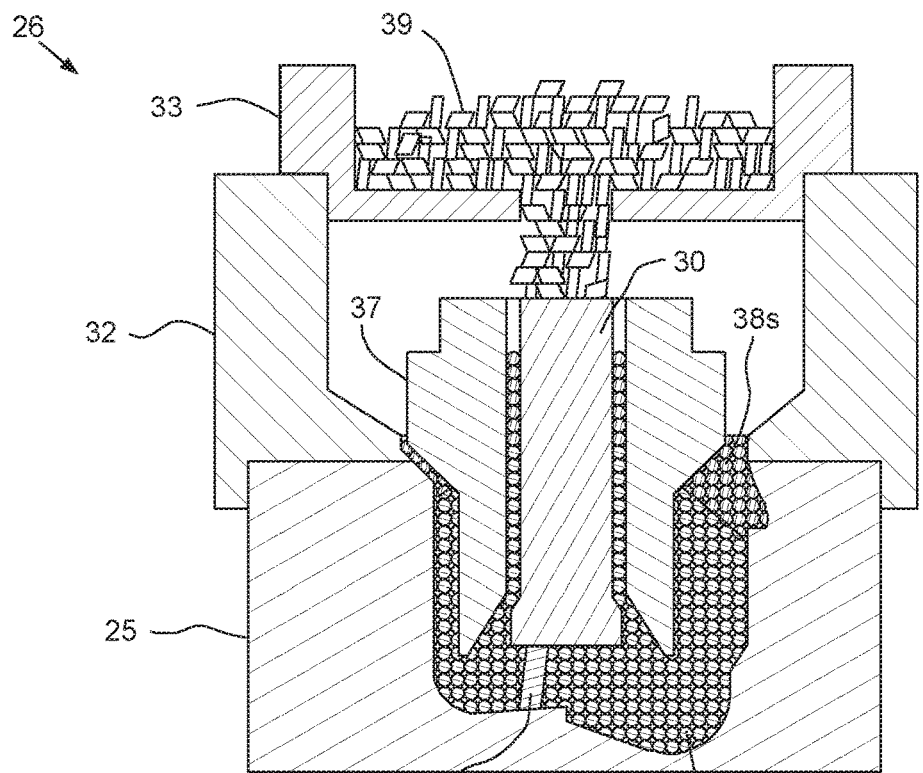
FIG. 8A illustrates the casting assembly.

FIGS. 6A-6C illustrate a mold 25 of a casting assembly 26 (FIG. 8A) for manufacture of a matrix body fixed cutter drill bit (not completely shown, see alloy body drill bit 1) having a second COS 27 (FIG. 10B), according to another embodiment of the present disclosure. FIG. 7A illustrates a typical leading cutter displacement 28 of the casing assembly 26. FIGS. 7B and 7C illustrate installation of the cutter displacement 28 into a displacement pocket 29 of the mold 25. FIG. 8A illustrates the casting assembly 26.

The casting assembly 26 may include the thick-walled mold 25, one or more displacements, such as the leading cutter displacements 28, a stalk 30 and one or more port displacements 31, a funnel 32, and a binder pot 33. Each of the mold 25, the displacements 28, 30, 31, the funnel 32, and the binder pot 33 may be made from a refractory material, such as graphite. The mold 25 may be fabricated with a precise inner surface forming a mold chamber using a CAD design model (not shown). The precise inner surface may have a shape that is a negative of what will become the facial features of the matrix drill bit.

The mold 25 may be fabricated with a displacement pocket 29 for each leading cutter pocket 34 (FIG. 9A) of the matrix drill bit. Each displacement pocket 29 may be shaped to receive a rear portion of the respective leading cutter displacement 28. Each displacement pocket 29 may be defined by a flat back wall 29b, an access groove 29g, a curved ledge 29d, and a keyway 29w. The keyway 29 may be formed in the back wall 29b adjacent to an edge thereof. The ledge 29d may extend from the back wall 29b and the groove 29g may be formed in the ledge adjacent to the edge of the back wall 29b. Each keyway 29w may include a semi-cylindrical mid-section and a pair of quarter-spherical end-sections.

Each leading cutter displacement 28 may be cylindrical having a rear face 28r for insertion into the displacement pocket 29, a front face 28f for extension into the mold chamber, and a side 28s extending between the faces. Each leading cutter displacement 28 may also have a key 28k protruding from the rear face 28r adjacent to an edge of the rear face. The key 28k may be formed as an integral part of the displacement 28 and may include a semi-cylindrical mid-section and a pair of quarter-spherical end-sections for mating engagement with the keyway 29w.

Each leading cutter displacement 28 may also have a key-former 28m formed therein. The key-former 28m may be located at an edge of the front face 28f and may extend therefrom along a portion of the side 28s. The key-former 28m may be a slot inclined relative to a longitudinal axis of the displacement 28 by an angle ranging between ten and seventy degrees. Each slot may have a length and a width corresponding the length and width of the keyway 3w, such as equal to or slightly less than. The key-former 28m may be angularly offset from the key 28k, such as being located opposite therefrom.

Each leading cutter displacement 28 may be aligned and inserted into the respective displacement pocket 29 such that the key 28k mates with the keyway 29w and mounted therein, such as by adhesive. The leading cutter displacements may be removed after infiltration to form the leading cutter pockets 34 in blades 36 (FIG. 9C) of the matrix drill bit for receiving respective shaped cutters 15. The port displacements 31 may be positioned adjacent to a bottom of the mold chamber and mounted to the mold. The stalk 30 may be positioned and mounted within the center of the mold chamber adjacent to a top of the port displacements 31. The stalk 30 may be removed after infiltration to form a bore 35b and plenum 35p (FIG. 9C) of the matrix drill bit. The port displacements 31 may be removed after infiltration to form respective ports 35n (FIG. 9C) of the matrix drill bit.

The casting assembly 26 may further include a plurality of backup cutter displacements (not shown) disposed adjacent to the bottom of the mold chamber and the backup cutter displacements may be removed after infiltration to form backup pockets in the blades 36 of the matrix drill bit for receiving respective backup cutters (FIG. 10A). The casting assembly 26 may further include a plurality of stud displacements (not shown) disposed adjacent to the bottom of the mold chamber and the stud displacements may be removed after infiltration to form pockets in the blades of the matrix drill bit for receiving respective studs (not shown).

Once the displacements 28, 30, 31 have been placed into the mold 25, a blank 37 may be placed within the casting assembly 25. The blank 37 may be tubular and may be made from an alloy, such as steel. The blank 37 may be centrally suspended within the mold 25 around the stalk 30 so that a bottom of the blank is adjacent to a bottom of the stalk. Once the displacements 28, 30, 31 and the blank 37 have been positioned within the mold 25, body powder 38b may be loaded into the mold to fill most of the mold chamber. The loading may include pouring of the body powder 38b into the mold 25 while compacting thereof, such as by vibrating the mold. The body powder 38b may be a ceramic, a cermet, or a mixture of a ceramic and a cermet. The ceramic may be a carbide, such as tungsten carbide, and may be cast and/or macrocrystalline. The cermet may include a carbide, such as tungsten carbide, cemented by a metal or alloy, such as cobalt.

Once loading of the body powder 38b has finished, shoulder powder 38s may be loaded into the mold 25 onto a top of the body powder to fill the remaining mold chamber. The shoulder powder 38s may be a metal or alloy, such as the metal component of the ceramic of the body powder 38b. For example, if the body powder is tungsten carbide ceramic and/or tungsten carbide-cobalt cermet, then the shoulder powder 38s would be tungsten.

Once loading of the shoulder powder 38s has finished, the binder pot 33 may be rested atop the funnel 32 and may be connected thereto, such as by a lap joint. The binder pot 33 may have a cavity formed therein and a sprue formed through a bottom thereof providing communication between the cavity and the funnel chamber. Binder 39 may then be placed into the cavity and through the sprue of the binder pot 33. The binder 39 may be in the form of pellets or chunks. The binder 39 may be an alloy, such as a copper based alloy. Once the binder 39 has been placed into the binder pot 33, flux (not shown) may be applied to the binder for protection of the binder from oxidation during infiltration.

Figure 8B:
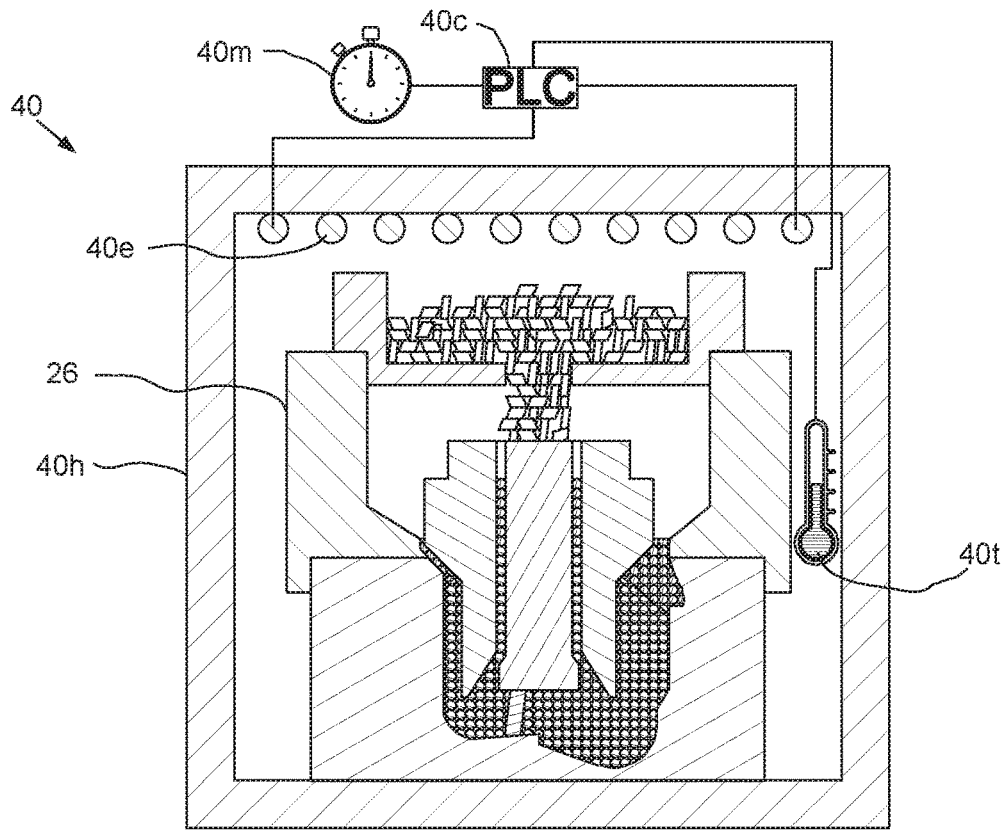
FIG. 8B illustrates the casting assembly placed in a furnace for melting binder thereof.

FIG. 8B illustrates the casting assembly 26 placed in a furnace 40 for melting binder 39 thereof. The furnace 40 may include a housing 40h, a heating element 40e, a controller, such as programmable logic controller (PLC) 40c, a temperature sensor 40t, and a power supply (not shown). The furnace 40 may be preheated to an infiltration temperature. The casting assembly 26 may be inserted into the furnace 40 and kept therein for an infiltration time 40m. As the casting assembly 26 is heated by the furnace 40, the binder 39 may melt and flow into the powders 38b,s through the sprue of the binder pot 33. The molten binder may infiltrate powders 38b,s to fill interparticle spaces therein. A sufficient excess amount of binder 39 may have been loaded into the binder pot 33 such that the molten binder fills a substantial portion of the funnel volume, thereby creating pressure to drive the molten binder into the powders 38b,s.

Figure 9A:
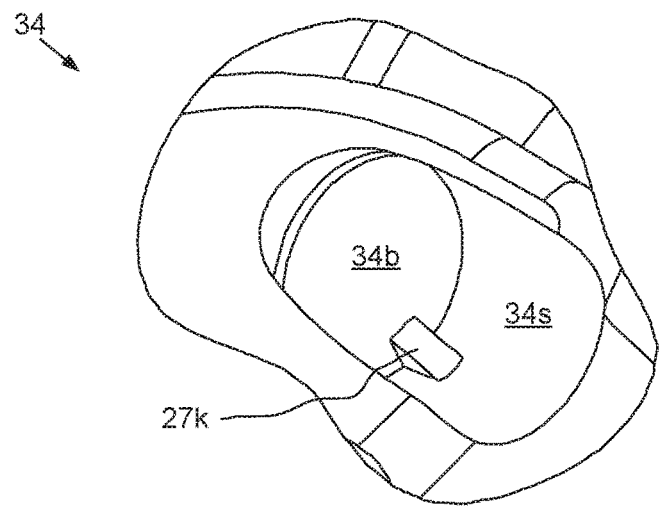
FIGS. 9A and 9B illustrate a typical leading cutter pocket of the matrix drill bit.
Figure 9B:
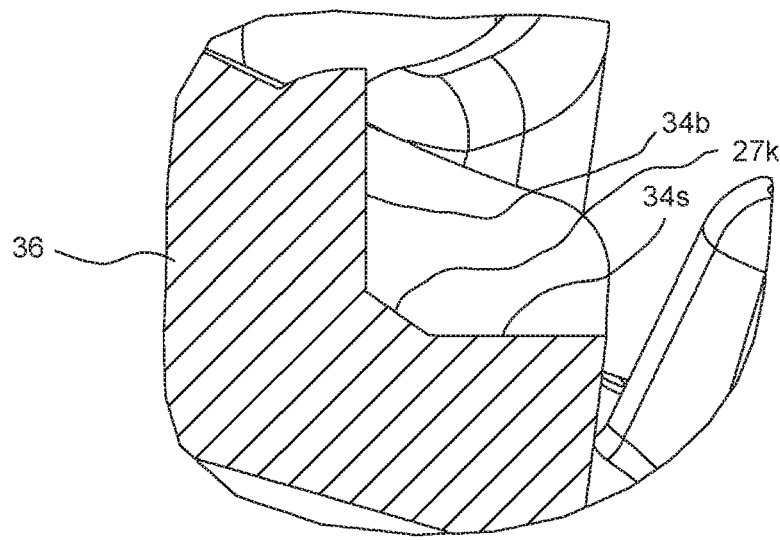
Figure 9C:
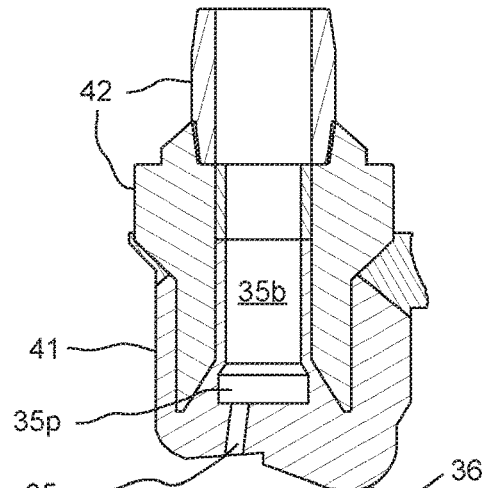
FIG. 9C illustrates the infiltrated body of the matrix drill bit.

FIGS. 9A and 9B illustrate the typical leading cutter pocket 34 of the matrix drill bit. FIG. 9C illustrates the infiltrated body 41 of the matrix drill bit. Once the binder 39 has infiltrated the powders 38b,s, the casting assembly 26 may be controllably cooled, such as by remaining in the furnace 40 with the heating element 40e shut off. Upon cooling, the binder 39 may solidify and cement the particles of the powders 38b,s together into a coherent matrix body 41. The binder 39 may also bond the body 41 to the blank 37. Once cooled, the casting assembly 26 may be removed from the furnace 40. The mold 25, funnel 32, and binder pot 33 may then be broken away from the body 41. A thread may be formed in an inner surface of the upper portion of the blank 37 and a threaded tubular extension screwed therein, thereby forming the shank 42. The threaded connection between the extension and the blank 37 may be secured by a weld.

Each leading cutter pocket 34 may be shaped to receive the substrate 17 of the respective shaped cutter 15. Each leading cutter pocket 34 may be defined by a curved sidewall 34s and a flat back wall 34b and have a key 27k formed therebetween by the key-former 28m. A center of each key 27k may be located at an edge of the respective leading cutter pocket 34 formed between the sidewall 34s and back wall 34b thereof. Each key 27k may be located at a center of the respective edge. Each key 27k may be wedge-shaped in order to mate with one of the keyways 3w of the shaped cutter 15.

FIGS. 10A-10C illustrate brazing of the shaped cutter 15 into the pocket 34 and engagement of the key 27k of the second COS 27 with one of the keyways 3w. The matrix body 41 and shank 42 may be moved to the cutter station. The shaped cutters 15 may be mounted in the leading cutter pockets 34 of the blades 36. Each cutter 15 may be delivered to the respective pocket 34 by the articulator 21. The articulator 21 may retain the shaped cutter 15 only partially in the pocket 34 such that the keyways 3w and key 27k do not engage.

Once delivered, the brazing material 20 may be applied to an interface formed between the respective pocket 34 and the cutter 15 using the applicator 22. As the brazing material 20 is being applied to the interface, the articulator 21 may rotate the shaped cutter 15 relative to the pocket 34 to distribute the brazing material 20 throughout the interface. The articulator 21 may then be operated to align one of the keyways 3w with the key 27k and engage the aligned members, thereby ensuring that the shaped cutter 15 is properly oriented within the respective pocket 4. Proper orientation may be that the operative ridge 19a is perpendicular to a projection (not shown, see projection 24) of the leading edge of the respective blade 36 through the leading cutter pocket 34.

A heater (not shown) may then be operated to melt the brazing material 20. Cooling and solidification of the brazing material 20 may mount the cutter 15 to the respective blade 36. The brazing operation may then be repeated until all of the shaped cutters 15 have been mounted to the respective blades 36. The brazing operation may also be repeated for mounting the backup cutters and studs into the backup pockets and stud pockets. Once the cutters 15 have been mounted to the respective blades 36, a nozzle (not shown) may be inserted into the each port 35n and mounted to the matrix body 41, such as by screwing the nozzle therein.

Figure 11A:
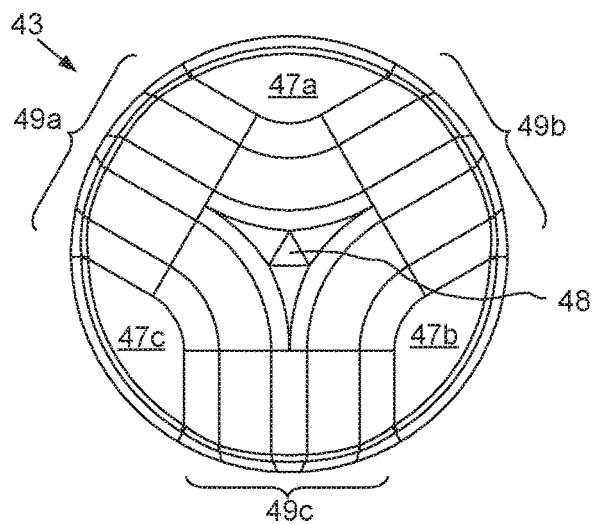
FIGS. 11A-11C illustrate a second shaped cutter for use with either COS, according to another embodiment of the present disclosure.
Figure 11D:
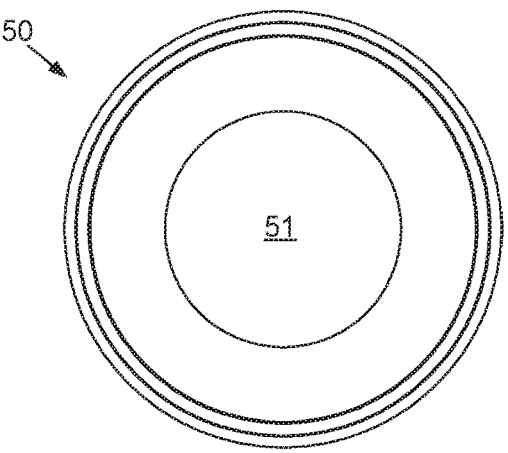
FIGS. 11D and 11E illustrate a third shaped cutter for use with either COS, according to another embodiment of the present disclosure.
Figure 11B:
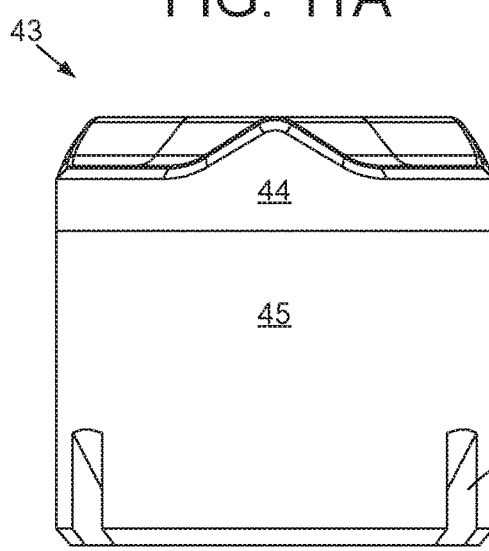
Figure 11E:
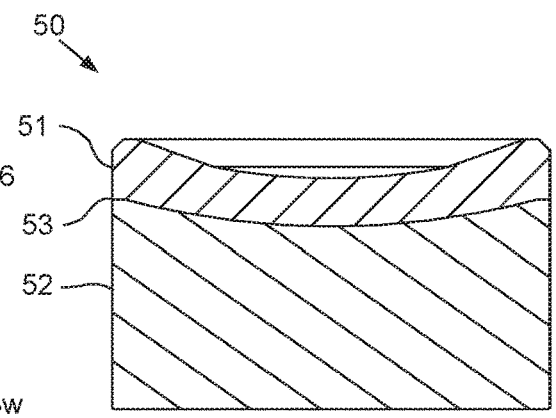
Figure 11C:
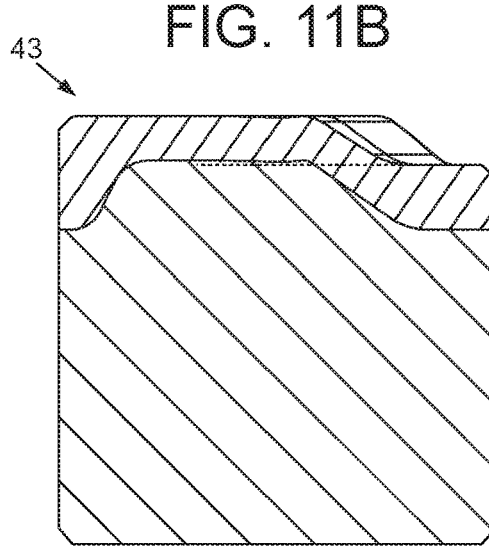

FIGS. 11A-11C illustrate a second shaped cutter 43 for use with either COS 3, 27, according to another embodiment of the present disclosure. The second shaped cutter 43 may include a non-planar cutting table 44 mounted to a cylindrical substrate 45. The cutting table 44 may be made from a superhard material, such as polycrystalline diamond, and the substrate 45 may be made from a hard material, such as a cermet, thereby forming a compact, such as a polycrystalline diamond compact. The cermet may be a cemented carbide, such as a group VIIIB metal-tungsten carbide. The group VIIIB metal may be cobalt.

The cutting table 44 may have an interface 46 with the substrate 45 at a lower end thereof and the working face at an upper end thereof. The working face may have a plurality of recessed bases 47a-c, a protruding center section 48, a plurality of protruding ribs 49a-c, and an outer edge. Each base 47a-c may be planar and perpendicular to a longitudinal axis of the second shaped cutter 43. The bases 47a-c may be located between adjacent ribs 49a-c and may each extend inward from a side of the cutting table 44. The outer edge may extend around the working face and may have constant geometry. The outer edge may include a chamfer located adjacent to the side and a round located adjacent to the bases 47a-c and ribs 49a-c.

Each rib 49a-c may extend radially outward from the center section 48 to the side. Each rib 49a-c may be spaced circumferentially around the working face at regular intervals, such as at one-hundred twenty degree intervals. Each rib 49a-c may have a triangular profile formed by a pair of curved transition surfaces, a pair of linearly inclined side surfaces, and a round ridge. Each transition surface may extend from a respective base 47a-c to a respective side surface. Each ridge may connect opposing ends of the respective side surfaces. An elevation of each ridge may be constant (shown), declining toward the center section, or inclining toward the center section.

An elevation of each ridge may range between twenty percent and seventy-five percent of a thickness of the cutting table 44. A width of each rib 49a-c may range between twenty and sixty percent of a diameter of the cutting table 44. A radial length of each rib 49a-c from the side to the center section 48 may range between fifteen and forty-five percent of the diameter of the cutting table 44. An inclination of each side surface relative to the respective base 47a-c may range between fifteen and fifty degrees. A radius of curvature of each ridge may range between one-eighth and five millimeters or may range between one-quarter and one millimeter.

The center section 48 may have a plurality of curved transition surfaces, a plurality of linearly inclined side surfaces, and a plurality of round edges. Each set of the features may connect respective features of one rib 49a-c to respective features of an adjacent rib along an arcuate path. The elevation of the edges may be equal to the elevation of the ridges. The center section 48 may further have a plateau formed between the edges. The plateau may have a slight dip formed therein.

The substrate 45 may have the interface 46 at an upper end thereof and a lower end for being received in either leading cutter pocket 4, 34. The substrate upper end may have a planar outer rim, an inner mound for each rib 49a-c, and a shoulder connecting the outer rim and each inner mound. A shape and location of the mounds may correspond to a shape and location of the ribs 49a-c and a shape and location of the outer rim may correspond to a shape and location of the bases 47a-c except that the mounds may not extend to a side of the substrate 45. Ridges of the mounds may be slightly above the bases 47a-c (see dashed line in FIG. 11C). A height of the mounds may be greater than an elevation of the ribs 49a-c. The substrate 45 may have a keyway 3w formed therein for each ridge of the respective rib 49a-c. Each keyway 3w may be located at the edge of the substrate 45 and may extend from the pocket end thereof along a portion of a side thereof. Each keyway 3w may be angularly offset from the associated ridge, such as being located opposite therefrom.

Alternatively, a ridge of each mound may be level with or slightly below the bases 47a-c.

FIGS. 11D and 11E illustrate a third shaped cutter 50 for use with either COS 3, 27, according to another embodiment of the present disclosure. The third shaped cutter 50 may include a concave cutting table 51 attached to a cylindrical substrate 52. The cutting table 51 may be made from a superhard material, such as polycrystalline diamond, attached to a hard substrate, such as a cermet, thereby forming a compact, such as a polycrystalline diamond compact. The cermet may be a cemented carbide, such as a group VIIIB metal-tungsten carbide. The group VIIIB metal may be cobalt.

The cutting table 51 may have an interface 53 with the substrate 52 and a working face opposite to the interface. The working face may have an outer chamfered edge, a planar rim adjacent to the chamfered edge, a conical surface adjacent to the rim, and a central crater adjacent to the conical surface. The interface 53 may have a planar outer rim and an inner parabolic surface. The thickness of the cutting table 51 may be a minimum at the crater and increase outwardly therefrom until reaching a maximum at the rim. A depth of the concavity may range between four percent and eighteen percent of a diameter of the third shaped cutter 50. The substrate 52 may have a plurality of keyways (not shown) formed therein and spaced therearound. Each keyway may be located at the edge of the substrate 52 and may extend from the pocket end thereof along a portion of a side thereof. Since the third shaped cutter 50 is symmetric, either COS 3, 27 may be used as an indexing system (should the cutter develop a wear flat) instead of an orienting system.

Alternatively, sides of the cutting table 51 and substrate 52 may each be elliptical instead of circular. Either COS 3, 27 may then be used to orient the major axis of the cutter to the proper orientation. Additionally, the concavity present in the working face may be defined by a curved or parabolic shape oriented along the major axis extending from end to end to form a parabolic (or hyperbolic paraboloid) concavity. The thickness of the cutting table may be thicker towards the outer edge thereof at the opposed ends and along the major axis and thinner towards a center of the cutter and along the minor axis. The concave working face may present a continuous curve from end to end along and in the direction of the major axis.

In another aspect of this alternative, the concavity present in the working face may be defined by a curved or parabolic shape oriented along the minor axis extending from end to end to form a parabolic or hyperbolic paraboloid concavity. The concave cutter face may present a continuous curve from end to end along the minor axis. The thickness of the cutting table may be thicker towards the outer edge thereof at the opposed ends and along the minor axis) and thinner towards the center of the cutter and along the major axis. For this aspect, either COS 3, 27 may then be used to orient the minor axis of the cutter to the proper orientation.

In another aspect of this alternative, the concavity present in the working face may be defined by a curved or parabolic shape oriented along each of the major axis and minor axis which results in the formation of spherical, elliptical paraboloid or ovoidal concavity. The concave working face may present a continuous curve along any selected orientation from end to end across the face. The thickness of the cutting table may be thicker towards the outer edge thereof at all locations therealong and thereabout while being thinner towards the center of the cutter. For this aspect, either COS 3, 27 may then be used to orient either the major or minor axis of the cutter to the proper orientation. The concavity on the face may presents a first counter angle in the direction of the major axis, and a second counter angle in the direction of the minor axis. These counter angles need not be equal to each other.

Alternatively, for circular sides of the cutting table 51 and substrate 52, the concavity present in the working face may be defined by a curved or parabolic shape oriented along the first axis extending from end to end to form a parabolic or hyperbolic paraboloid concavity. The concave working face may present a continuous curve from end to end along the first axis. The thickness of the cutting table may be thicker towards the outer edge thereof at the opposed ends and along the first orientation axis and thinner towards the center of the cutter and along a second axis orthogonal to the first axis. For this alternative, either COS 3, 27 may then be used to orient the first axis of the cutter to the proper orientation. The concavity on the face may present a counter angle in the direction of the first axis.

Alternatively, for circular sides of the cutting table 51 and substrate 52, the concavity present on the working face may be defined by a curved or parabolic shape oriented along each of the two orthogonal axes which results in the formation of spherical, elliptical paraboloid or ovoidal concavity. The concave working face may present a continuous curve along any selected orientation from end to end across the face. The thickness of the cutting table may be thicker towards the outer edge thereof at all locations therealong and thereabout while being thinner towards the center of the cutter. For this alternative, either COS 3, 27 may then be used to orient either axis of the cutter to the proper orientation. The concavity on the working face may present a first counter angle in the direction of the first axis, and a second counter angle in the direction of the second axis. These counter angles need not be equal to each other.

Alternatively, for circular sides of the cutting table 51 and substrate 52, The concavity present on the working face may be defined by a curved or parabolic shape oriented along the first axis extending from the center towards a first end to form a parabolic (or hyperbolic paraboloid) concavity at that end and a planar surface at an opposite second end. The concave working face may present a continuous curve extending along the first axis from the flat surface associated with the second end and center and terminating at the first end. The thickness of the cutting table may be thicker towards the outer edge thereof at only the first end along the first orientation axis and thinner towards the center and towards the second end along the first orientation axis. The cutting table may have a substantially constant thickness from the second end toward the center along the first axis and then may increase from the center towards the first end along the first orientation axis. For this alternative, either COS 3, 27 may then be used to orient the first end of the cutter to the proper orientation. The concavity on the working face may present a counter angle in the direction of the first axis.

Alternatively, for elliptical sides of the cutting table 51 and substrate 52, the cutter may be severed along the minor axis and each half used as a separate cutter. The concavity present on the working face may be defined by a curved or parabolic shape oriented along each of the major axis and minor axis which results in the formation of spherical, elliptical paraboloid or ovoidal concavity associated with the included half. The concave working face may present a continuous curve along any selected orientation from end to end across the face. The thickness of the cutting table may be thicker towards the outer edge thereof at all locations therealong and thereabout while being thinner towards the center at the cut-off flat edge of the cutter along the minor axis. For this alternative, either COS 3, 27 may then be used to orient the end opposite to the cut-off flat edge of the cutter to the proper orientation. The concavity may present a first counter angle in the direction of the major axis, and a second counter angle in the direction of the minor axis. These counter angles need not be equal to each other.

Alternatively, for elliptical sides of the cutting table 51 and substrate 52, the cutter may be severed along the minor axis and each half used as a separate cutter. The concavity present on the working face may be defined by a curved or parabolic shape oriented along the major axis extending from center to end to form a parabolic or hyperbolic paraboloid concavity. The concave cutter face may presents a continuous curve from center to a first end along the major axis. The thickness of the cutting table may be thicker towards the outer edge of the cutter 30 at the first end along the major axis while being thinner towards a center of the cutter at the cut-off flat edge of the cutter. For this alternative, either COS 3, 27 may then be used to orient the first end opposite to the proper orientation. The concavity on the face may present a counter angle in the direction of the major axis.

Alternatively, for elliptical sides of the cutting table 51 and substrate 52, the cutter may be severed along the major axis and each half used as a separate cutter. The concavity present on the working face of the cutter may be defined by a curved or parabolic shape oriented along the minor axis extending from center to a first end to form a parabolic or hyperbolic paraboloid concavity. The concave working face may present a continuous curve from center to the first end along the major axis. The thickness of the cutting table may be thicker towards the outer edge thereof at the first end along the minor axis while being thinner towards the center at the cut-off flat edge. For this alternative, either COS 3, 27 may then be used to orient the first end to the proper orientation. The concavity on the face may present a counter angle in the direction of the minor axis.

Alternatively, for circular sides of the cutting table 51 and substrate 52, the cutter may be severed in half and each half used as a separate cutter. The concavity present on the working face may be defined by a curved or parabolic shape oriented along the first axis extending from center to a first end opposite the cut-off flat edge to form a parabolic or hyperbolic paraboloid concavity. The concave working face may present a continuous curve from center to the first end along the first axis. The thickness of the cutting table may be thicker towards the outer edge thereof at the end along the first axis while being thinner towards the center of the cutter at the cut-off flat edge. For this alternative, either COS 3, 27 may then be used to orient the first end to the proper orientation. The concavity on the face may present a counter angle in the direction of the first axis.

Alternatively, for circular sides of the cutting table 51 and substrate 52, the cutter may be severed in half and each half used as a separate cutter. The concavity present on the working face may be defined by a curved or parabolic shape oriented along each of the first axis extending from center to a first end opposite the cut-off edge and the cut-off edge which results in the formation of spherical, elliptical paraboloid or ovoidal concavity associated with the included half. The concave cutter face may present a continuous curve along any selected orientation from end to end across the face. The thickness of the cutting table may be thicker towards the outer edge thereof at all locations therealong and thereabout while being thinner towards a center of the cutter along the cut-off edge. For this alternative, either COS 3, 27 may then be used to orient the first end to the proper orientation. The concavity may present a first counter angle in the direction of the first axis, and a second counter angle in the direction of the second axis. These counter angles need not be equal to each other.

Alternatively, for elliptical sides of the cutting table 51 and substrate 52, the concavity present on the working face may be defined by a curved or parabolic shape oriented along the major axis extending from center towards first end to form a parabolic or hyperbolic paraboloid concavity at that end and a planar surface at opposite second end. The concave cutter face presents a continuous curve extending along the major axis from the flat surface associated with the first end and center and terminating at the second end. The thickness of the cutting table may be thicker towards an outer edge thereof at the first end along the major axis and thinner towards the center and at the second end along the major axis. The cutting table may have a substantially constant thickness from the second end toward the center along the major axis. The thickness of the cutting table may then increase from the center towards the first end along the major axis. For this alternative, either COS 3, 27 may then be used to orient the first end to the proper orientation. The concavity on the face presents a counter angle in the direction of the major axis.

Alternatively, for elliptical sides of the cutting table 51 and substrate 52, the concavity present on the working face may be defined by a curved or parabolic shape oriented along the minor axis extending from center towards a first end to form a parabolic (or hyperbolic paraboloid) concavity at that end and a planar surface at an opposite second end. The concave cutter face presents a continuous curve extending along the minor axis from the flat surface associated with the second end and center and terminating at the first end. The thickness of the cutting table may be thicker towards the outer edge thereof at the first end along the minor axis and thinner towards the center of the cutter and the second end along the minor axis. The cutting table layer may have a substantially constant thickness from the second end toward the center along the minor axis. The thickness of the cutting table may then increase from the center towards the first end along the minor axis.

Alternatively, for elliptical sides of the cutting table 51 and substrate 52, along the major axis thereof, the working face may be divided into two halves. A first half may extend from the center towards a first end. A second half may extend from the center towards a second end. The concavity present on the working face may be defined in only the second half by a curved or parabolic shape oriented along the major axis extending from center towards the second end to form a parabolic or hyperbolic paraboloid concavity in the second half while the first half presents a planar surface. The concave working face may present a continuous curve extending along the major axis from the center and terminating at the second end. The thickness of the cutting table in the first half may be substantially constant. However, the thickness of the cutting table in the second half may be thicker towards the center and the outer edge thereof at the second end along the major axis while being thinner at points between the center of the cutter and the second end along the minor axis. The thickness of the cutting table in the first half may be generally equal to the maximum thickness of the cutting table in the second half. For this alternative, either COS 3, 27 may then be used to orient the major axis and the second end to the proper orientation.

Alternatively, for elliptical sides of the cutting table 51 and substrate 52, along the major axis of the elliptical cutter, the face may be divided into two halves. A first half may extend from the center towards a first end. A second half may extend from the center towards a second end. The concavity present on the working face may be defined such that each of the first half and second half presents a separate or distinct concave cutter shape defined by a curved or parabolic shape oriented along the major axis extending from center towards either the first end or the second end to form a distinct parabolic or hyperbolic paraboloid concavity in each of the first half and the second half. Each concave cutter face may present a continuous curve extending along the major axis from the center and terminating at either the first end or the second end. The thickness of the cutting table in each of the first half and second half may be thicker towards the center and the outer edge thereof at the first end along the major axis and thinner at points between the center of the cutter and the first end along the minor axis. With respect to the second half, the cutting table may be thicker towards the center and the outer edge thereof at the second end along the major axis and thinner at points between the center of the cutter and the second end along the minor axis. For this alternative, either COS 3, 27 may then be used to orient the major axis and either the first or second end to the proper orientation.

Figure 11F:
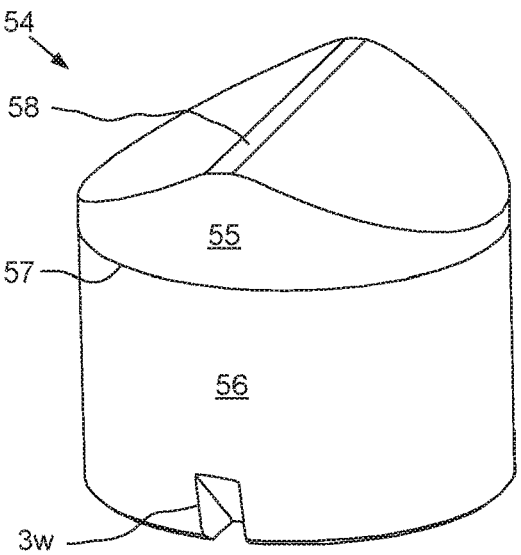
FIG. 11F illustrates a fourth shaped cutter for use with either COS, according to another embodiment of the present disclosure.

FIG. 11F illustrates a fourth shaped cutter 54 for use with either COS 3, 27, according to another embodiment of the present disclosure. The fourth shaped cutter 54 may include a non-planar cutting table 55 mounted to a cylindrical substrate 56. The cutting table 55 may be made from a superhard material, such as polycrystalline diamond, and the substrate 56 may be made from a hard material, such as a cermet, thereby forming a compact, such as a polycrystalline diamond compact. The cermet may be a cemented carbide, such as a group VIIIB metal-tungsten carbide. The group VIIIB metal may be cobalt.

The cutting table 55 may have an interface 57 with the substrate 56 at a lower end thereof and the working face at an upper end thereof. The working face may have an outer edge and a ridge 58 protruding a height above the substrate and at least one recessed region extending laterally away from the ridge 58. The ridge 58 may be centrally located in the working face and extend across the working face. The presence of the ridge 58 may result in the outer edge undulating with peaks and valleys. The portion of the ridge 58 adjacent to the outer edge may be an operative portion. Since the ridge 58 extends across the working surface, the ridge may have two operative portions. The working face may further include a pair of recessed regions continuously decreasing in height in a direction away from the ridge 58 to the outer edge that is the valley of the undulation thereof. The ridge 58 and recessed regions may impart a parabolic cylinder shape to the working face. The outer edge of the cutting table 55 may be chamfered (not shown).

The substrate 56 may include a keyway 3*w* for each operative portion of the ridge 58. Each keyway 3*w* may be located at the edge of the substrate 56 and may extend from the pocket end thereof along a portion of a side thereof. Each keyway 3w may be angularly offset from the associated operative portion, such as being located opposite therefrom.

While the foregoing is directed to embodiments of the present disclosure, other and further embodiments of the disclosure may be devised without departing from the basic scope thereof, and the scope of the invention is determined by the claims that follow.

The invention claimed is:

1. A bit for drilling a wellbore, comprising:
a shank having a coupling formed at an upper end thereof;
a body mounted to a lower end of the shank; and
a cutting face forming a lower end of the bit and comprising:
    a blade protruding from the body;
    a cutter comprising:
        a cylindrical substrate mounted in a pocket formed in the blade by brazing material; and
        a cutting table made from a superhard material, mounted directly to the substrate, and having a non-planar working face with a cutting feature; and
    a cutter orienting system, comprising:
        a keyway formed in the substrate; and
        a key formed in or mounted to the pocket and engaged with the keyway,
    wherein:
        the keyway is a slot located at an edge of the substrate, and
        the key is located at an edge of the pocket.

2. The bit of claim 1, wherein:
the cutting feature is a protruding ridge,
the working face has a plurality of protruding ridges spaced therearound,
the cutter orienting system comprises keyway for each ridge,
the keyways are spaced around the substrate, and
each keyway is located opposite from a respective ridge.

3. The bit of claim 1, wherein:
the working face is concave, and
the cutting feature is an axis of the cutting table.

4. The bit of claim 1, wherein the cutting feature is an operative portion of a protruding ridge.

5. The bit of claim 1, wherein the key is a spring pin disposed in a socket formed in the pocket.

6. The bit of claim 1, wherein the key is wedge-shaped and formed integrally with the blade.

7. The bit of claim 1, wherein:
the working face has a plurality of cutting features spaced therearound,
the cutter orienting system comprises a plurality of keyways spaced around the edge of the substrate, and
the key is the only key of the cutter orienting system.

8. The bit of claim 1, wherein:
the pocket is defined by a curved sidewall and a flat back wall, and
the edge of the pocket is formed between the sidewall and the back wall.

9. The bit of claim 8, wherein the key is located at a center of the edge.

10. The bit of claim 1, wherein the keyway is inclined relative to a longitudinal axis of the cutter by an angle ranging between ten and seventy degrees.

11. The bit of claim 1, wherein:
the pocket is formed in a leading edge of the blade, and
the cutter is oriented such that the cutting feature is perpendicular to a projection of the leading edge through the pocket.

12. The bit of claim 1, wherein:
the bit further comprises a gage section forming an outer portion of the bit, and
the blade extends from a center of the cutting face to the gage section.

13. The bit of claim 1, wherein an outer edge of the working face has a constant geometry.

14. A bit for drilling a wellbore, comprising:
a shank having a coupling formed at an upper end thereof;
a body mounted to a lower end of the shank; and
a cutting face forming a lower end of the bit and comprising:
    a blade protruding from the body;
    a cutter comprising:
        a cylindrical substrate mounted in a pocket formed in the blade by brazing material; and
        a cutting table made from a superhard material and mounted directly to the substrate; and
    a cutter orienting system, comprising:
        a keyway formed in an edge of the substrate; and
        a key formed in or mounted to the pocket at an edge of the pocket and engaged with the keyway,
    wherein the keyway is a slot.

* * * * *